United States Patent Office 3,686,184
Patented Aug. 22, 1972

3,686,184
3,4-DIHYDRO-2(1H)-ISOQUINOLINE-CARBOXAMIDOXIMES
Denis M. Bailey, East Greenbush, N.Y., assignor to Sterling Drug Inc., New York, N.Y.
No Drawing. Continuation-in-part of application Ser. No. 727,065, May 6, 1968. This application Apr. 2, 1970, Ser. No. 25,250
Claims priority, application Great Britain, Apr. 21, 1969, 20,341/69
The portion of the term of the patent subsequent to Apr. 7, 1987, has been disclaimed
Int. Cl. C07d 35/10
U.S. Cl. 260—288 R     17 Claims

ABSTRACT OF THE DISCLOSURE 3,4 - dihydro - 2(1H) - isoquinolinecarboxamidoxime derivatives, having hypotensive activity, are prepared by reacting the corresponding 3,4-dihydro-2(1H)-isoquinolinecarbonitrile with hydroxylamine.

---

This invention relates to compositions of matter known in the art of chemistry as substituted-isoquinolines and their preparation.

This application is a continuation-in-part of copending application Ser. No. 727,065, filed May 6, 1968 and now U.S. Pat. 3,505,336, isued Apr. 7, 1970.

The invention sought to be patented, in its composition aspect, resides in the compounds which I designate as 3,4-dihydro-2(1H)-isoquinolinecarboxamidoximes of the Formula I

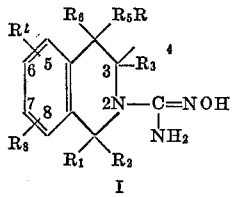

where $R_7$ and $R_8$ are each hydrogen, lower-alkyl, lower-alkoxy, halo, hydroxy or lower-alkanoylamino; $R_1$ is hydrogen, lower-alkyl or trifluoromethyl; $R_2$ is hydrogen or lower-alkyl; $R_3$ and $R_4$ are each hydrogen or lower-alkyl; $R_5$ is hydrogen, lower-alkyl or hydroxy; $R_6$ is hydrogen or lower-alkyl; and provided at least one of the positions 1, 3 and 4 of the isoquinoline ring is substituted twice by lower-alkyl or position 1 is substituted by trifluoromethyl or position 4 is substituted by hydroxy when $R_7$ and $R_8$ are each hydrogen, lower-alkyl, lower-alkoxy or halo, where lower-alkyl, each occurrence, is primary or secondary. The compounds of the composition aspect of the invention, when tested according to standard pharmacological evaluation procedures in animals, have been found to possess the inherent applied use characteristics of exerting an antihypertensive effect in animal organisms, thereby indicating their utility as hypotensive agents.

Another aspect of the invention resides in the compounds which I designate as 3,4-dihydro-2(1H)-isoquinolinecarboxamidoximes optionally mono-substituted or di- (or tri)-substituted by lower-alkanoyl, respectively, at the oxygen atom or the oxygen atom and the terminal nitrogen atom of the carboxamidoxime moiety. The substitution of simple moieties on the benzene ring of the isoquinoline ring, i.e., at the 5-, 6-, 7- or 8-positions, or the substitution of lower-alkyl at the 1- and/or 3-positions of the isoquinoline ring does not adversely affect the pharmacological activity of the compounds. Illustrative but not limitative examples of such simple moieties are lower-alkyl, lower-alkoxy, halo, hydroxy, lower-alkylmercapto, lower-alkylsulfonyl, benzyloxy, trihalomethyl, lower-alkanoylamino, and nitro. Specific compounds of the invention, when tested according to standard pharmacological evaluation procedures in animals, have been found to exert an anti-hypertensive effect in animal organisms, thereby indicating their utility as hypotensive agents.

Without limiting the generality of the foregoing, illustrative and preferred embodiments of the 3,4-dihydro-2(1H)-isoquinolinecarboxamidoximes of the invention are the compounds of Formula I'

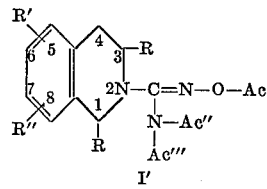

where R is hydrogen or lower-alkyl, R' and R" are each hydrogen, lower-alkyl, lower-alkoxy, hydroxy, halo, lower-alkylmercapto, lower-alkylsulfonyl, benzyloxy, trihalomethyl, lower-alkanoylamino or nitro, and Ac', Ac" and Ac''' are each hydrogen, Ac' is lower-alkanoyl and Ac" and Ac''' are each hydrogen, Ac' and Ac" are each lower-alkanoyl and Ac''' is hydrogen, or Ac', Ac" and Ac''' are each lower-alkanoyl, Ac', Ac" and Ac''' being only hydrogen when R' or R" is hydroxy.

A particularly preferred aspect of my invention is the compound 3,4 - dihydro-1,3-dimethyl-2(1H)-isoquinolinecarboxamidoxime of the Formula I"

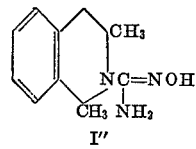

This compound is capable of existing in two diastereoisomeric forms, namely, the cis compound having the stereochemical configuration I'''

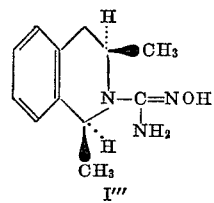

and the trans form having the stereochemical configuration I''''

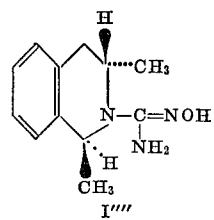

Moreover, both the cis and trans forms are capable of being resolved into their respective optical antipodes, the (+) and the (−) rotatory forms of the cis configuration and the (+) and the (−) rotatory forms of the trans configuration. Of these four forms, especially preferred is the cis form which in the form of its free base in a 1% solution in chloroform is (−)-rotatory.

The invention sought to be patented, in its process aspect, resides in the process of preparing said 3,4-dihydro-2(1H) - isoquinolinecarboxamidoximes which comprises reacting the corresponding 3,4-dihydro-2(1H)-isoquinolinecarbonitrile of the Formula II

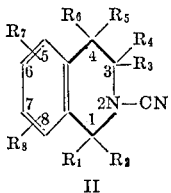

with hydroxylamine, where $R_1$, $R_2$, $R_3$, $R_4$, $R_5$, $R_6$, $R_7$ and $R_8$ each have the meanings given above for the compounds of Formula I.

Another aspect of the invention relates to a process of preparing said 3,4 - dihydro - 2(1H) - isoquinolinecarboxamidoximes which comprises reacting the corresponding 3,4-dihydro-2(1H)-isoquinolinecarbonitrile with hydroxylamine and, if desired, forming the O-mono-(lower-alkanoate), N,O - di - (lower - alkanoate) or N,N,O - tri-(lower-alkanoate) of said carboxamidoxime by further reacting it with one, two or three molar equivalents of a lower-alkanoylating agent. In this process aspect of the invention, as illustrated for preferred embodiments, compounds of Formula I' where Ac', Ac" and Ac'" are each hydrogen are prepared by reacting with hydroxylamine the corresponding 3,4 - dihydro-2(1H)-isoquinolinecarbonitrile of the Formula II'

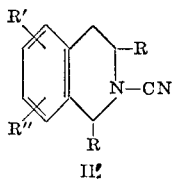

where R, R' and R" of the meanings given above for Formula I'. The compounds of Formula I' where Ac' is lower-alkanoyl and Ac" or Ac'" is hydrogen or lower-alkanoyl are prepared by reacting the compound of Formula I' where Ac', Ac" and Ac'" are each hydrogen with one, two (or three) molar equivalents of a lower-alkanoylating agent to form, respectively, its O-mono-(lower-alkanoate), i.e., where Ac' is lower-alkanoyl and Ac" and Ac'" are hydrogen; its N,O-di-(lower-alkanoate), i.e., where Ac' and Ac" are each lower-alkanoyl and Ac'" is hydrogen; or its N,N,O-tri-(lower-alkanoate), i.e., where Ac', Ac" or Ac'" are each lower-alkanoyl.

The term "lower-alkyl," as used herein, means a primary or secondary alkyl radical having from one to six carbon atoms inclusive, illustrated by methyl, ethyl, isopropyl, n-propyl, n-butyl, sec-butyl, isobutyl, n-amyl, n-hexyl, and the like.

The term "lower-alkoxy," as used herein, means an alkoxy radical having from one to six carbon atoms inclusive, illustrated by methoxy, ethoxy, n-propoxy, isopropoxy, n-butoxy, sec-butoxy, isobutoxy, n-hexoxy, and the like.

The term "halo," as used herein, means chloro, bromo, iodo or fluoro.

The term "lower-alkanoyl," as used herein, means alkanoyl radicals having from two to six carbon atoms inclusive which can be arranged as straight or branched chains, among which are, for purposes of illustration but without limiting the generality of the foregoing, acetyl, propionyl (n-propanoyl), isobutyryl (2-methyl-n-propanoyl) and caproyl (n-hexanoyl).

The 3,4-dihydro-2(1H)-isoquinolinecarboxamidoximes of the invention are useful in the free base form or in the form of their acid-addition salts, and both forms are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

The molecular structures of the 3,4-dihydro-2(1H)-isoquinolinecarboxamidoximes of the invention are assigned on the basis of evidence provided by infrared (IR) and nuclear magnetic resonance (NMR) spectra, and, by the correspondence of calculated and found values for the elementary analyses for representative examples.

The manner of making and using our invention will now be generally described so as to enable the person skilled in the art of organic chemistry to make and use the same.

The 3,4 - dihydro-2(1H)-isoquinolinecarboxamidoximes of the invention are prepared by reacting the corresponding 3,4-dihydro-2(1H)-isoquinolinecarbonitrile with hydroxylamine. The reaction is conveniently and preferably carried out by mixing the reactants in a suitable solvent at room temperature (about 25–30° C.) and then heating (about 75–100° C. or higher) if necessary. Suitable solvents are organic solvents, e.g., methanol, ethanol, dimethylformamide, tetrahydrofuran, and the like.

Said reaction of the 3,4-dihydro-2(1H)-isoquinolinecarboxamidoximes with a lower-alkanoylating agent to form the O-mono-(lower-alkanoate), i.e., where Ac' is lower-alkanoate and Ac" is hydrogen, is carried out preferably by using one molar equivalent of a lower-alkanoyl chloride per mole of carboxamidoxime. The reaction of the 3,4-dihydro-2(1H)-isoquinolinecarboxamidoxime with a lower-alkanoylating agent to form the N,O-di-(lower-alkanoate), i.e., where Ac' and Ac" are each lower-alkanoyl, or to form the N,N,O-tri-(lower-alkanoate), i.e., where Ac', Ac" and Ac'" are each lower-alkanoyl, is carried out preferably by using two or three molar equivalent of a lower-alkanoic anhydride per mole of carboxamidoxime.

The intermediate 3,4-dihydro-2(1H)-isoquinolinecarbonitriles of Formula II' are prepared by well-known methods, e.g., by reacting the corresponding known 1,2,3,4-tetrahydroisoquinolines with cyanogen bromide. Said 1,2,3,4-tetrahydroisoquinolines are prepared by various known methods, some of which are illustrated in the examples hereinbelow.

The intermediate 3,4-dihydro-2(1H)-isoquinolinecarbonitriles of Formula II are prepared by well-known methods, e.g., by reacting cyanogen bromide with the corresponding 1,2,3,4-tetrahydroisoquinoline. Said 1,2,3,4-tetrahydroisoquinolines are either known or prepared by standard chemical procedures. For example, one multistep procedure first consists of reacting a phenethylamine of Formula III

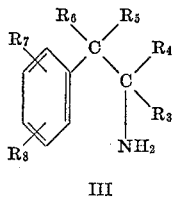

III with an acyl anhydride of the formula $(R_1CO)_2O$ to form the corresponding N-acyl compound of Formula IV

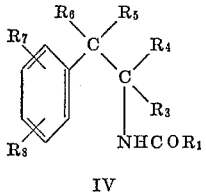

IV which on heating with a mixture of phosphorous oxychloride and phosphorous pentoxide ring closes to form a 1-$R_1$-3,4-dihydroisoquinoline of Formula V

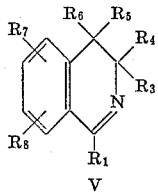

V which, in turn is catalytically hydrogenated using a suitable catalyst, e.g., platinum dioxide, to produce the corresponding 1,2,3,4-tetrahydro-1-$R_1$-isoquinoline of Formula VI

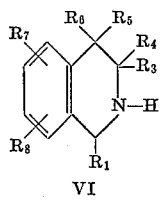

VI

Variations and modifications of the above procedure also can be used to prepare the intermediate 1,2,3,4-tetrahydroisoquinolines. For example, in the first step the phenethylamine of Formula III can be replaced by the corresponding phenylacetonitrile of Formula VII

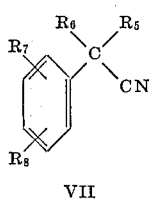

VII which is catalytically hydrogenated in the presence of said acyl anhydride of the formula $(R_1CO)_2O$ to yield the compound of Formula IV where $R_3$ and $R_4$ are each hydrogen.

Another modification consists in reacting the 3,4-dihydroisoquinoline of Formula V with a benzyl halide, e.g., benzyl iodide, to form the corresponding 2-benzyl-3,4-dihydroisoquinolinium iodide which on treatment with a suitable Grignard agent of the formula $R_2$—Mg—halide where $R_2$ is lower-alkyl produces the corresponding 1-$R_1$-1-$R_2$-2-benzyl-1,2,3,4-tetrahydroisoquinoline which on catalytic hydrogenation in the presence of a suitable catalyst, e.g., palladium-on-charcoal, removes the N-benzyl group to give the corresponding 1-$R_1$-1-$R_2$-1,2,3,4-tetrahydroisoquinoline of Formula VIII

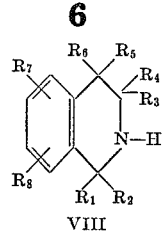

VIII

The foregoing preparations of the intermediate 1,2,3,4-tetrahydroquinolines as well as other methods for their preparation using known compounds are illustrated hereinbelow.

The best mode contemplated for carrying out the invention will now be set forth, as follows:

(A) 1,2,3,4-TETRAHYDROISOQUINOLINES (1) 1,2,3,4-tetrahydro-6-methoxy-1-methylisoquinoline: To 64.0 g. of 2-(3-methoxyphenyl)ethylamine was added with stirring 25.2 g. of acetic acid; the mixture was heated to 180° C. and then allowed to cool to 135 C., allowing the water to boil off during this time. When the temperature of the mixture reached 135° C., it was poured into 250 ml. of xylene and the solution dried over anhydrous magnesium sulfate. To the xylene solution containing N-[2-(3-methoxyphenyl)ethyl]-acetamide was added with stirring 110 ml. of phosphorus oxychloride and 110 g. of phosphorus pentoxide and the mixture slowly heated with stirring over one hour to reflux and then refluxed for an hour with stirring. To the mixture cooled in an ice-methanol bath was carefully added ice and water, and the mixture stirred for two hours. The organic layer was separated and the water layer washed with xylene. The xylene layer was washed with water. The aqueous layer and washings were combined and diluted to about ten liters with water and ice, and then made basic with 35% aqueous sodium hydroxide solution. The basic solution was extracted with chloroform. The chloroform extract was dried over anhydrous magnesium sulfate and, after treating with decolorizing charcoal, was concentrated in vacuo to remove the ether and to yield 3,4-dihydro-6-methoxy-1-methylisoquinoline. This compound was dissolved in acetic acid and the solution diluted with acetic acid to a volume of 600 ml. To the solution was added 2.0 g. of platinum dioxide and the mixture subjected to catalytic hydrogenation until the theoretical quantity of hydrogen was taken up. The catalyst was removed by filtration; the filtrate concentrated in vacuo to remove the acetic acid; and, the residue distilled under reduced pressure to yield 56.3 g. of 1,2,3,4-tetrahydro-6-methoxy-1-methylisoquinoline.

(2) 1,2,3,4-tetrahydro-6-hydroxy-1-methylisoquinoline: A mixture containing 32.5 g. of 1,2,3,4-tetrahydro-6-methoxy-1-methylisoquinoline and 200 ml. of 62% hydrobromic acid was heated to reflux for one and one-half hours and the hot mixture poured into an equal volume of water. The mixture was cooled and the separated product was collected, washed with isopropyl acetate and sucked dry to yield 37.0 g. of 1,2,3,4-tetrahydro-6-hydroxy-1-methylisoquinoline hydrobromide.

(3) 1,2,3,4 - tetrahydro - 1,4,4-trimethylisoquinoline: Methyl bromide was passed into 400 ml. of dimethylsulfoxide with stirring for fifteen minutes. To this stirred solution was simultaneously added dropwise with stirring two separate solutions, one containing 100 g. of sodium hydroxide in 100 ml. of water and the other containing 58.5 g. of phenylacetonitrile in 70 ml. of dimethyl sulfoxide, the temperature of the reaction mixture being kept at about 35 to 42° C. with external cooling and the addition carried out over a period of forty-five minutes. Additional methyl bromide was passed into the stirred reaction mixture for an hour utilizing a solid carbon dioxide condenser to conserve the methyl bromide; no external cooling was necessary during this period. The reaction mixture was diluted with 3.2 liters of water and the mixture extracted with two 700 ml. portions of n-hexane. The hexane extract was washed three times with water, dried over anhydrous magnesium sulfate and evaporated in vacuo to yield 72.8 g. of pale yellow oil containing α,α-dimethylphenylacetonitrile. The oil was dissolved in 300 ml. of absolute ethanol and refluxed for four hours in the presence of Raney nickel. The resulting green solution was evaporated in vacuo to yield 66.8 g. of a pea green opaque liquid which was diluted to a volume of about 250 ml. with acetic anhydride. One-half of this solution was transferred to a hydrogenation bottle, 10 g. of anhydrous sodium acetate was added and hydrogenation was carried out at about 50°–100° C. in the presence of Raney nickel. The hot reaction mixture was filtered and the catalyst washed with acetic anhydride. The combined filtrate from the reaction mixture and the washings were evaporated in vacuo and the residue was taken up in benzene and water. The mixture was shaken well, the layers separated, and the benzene solution washed successively with with, 2 N hydrochloric acid and brine. The benzene solution was dried over anhydrous magnesium sulfate and evaporated in vacuo to yield 48 g. of N-(2-methyl-2-phenylpropyl)acetamide. A sample of this compound was crystallized from n-hexane, M.P. 76–77° C. The N-(2-methyl-2-phenylpropyl)acetamide (47 g.) was converted into 3,4-dihydro-1,4,4-trimethylisoquinoline (28.3 g. as an oil) following the procedure described in Example A–1 using 80 g. of phosphorus oxychloride and 80 g. of phosphorus pentoxide. The 3,4-dihydro-1,4,4-trimethylisoquinoline (28.2 g.) was converted to 1,2,3,4-tetrahydro-1,4,4-trimethylisoquinoline, B.P. 136–138° C. at 23 mm. 22.9 g., following the hydrogenation procedure described in Example A–1 using 150 ml. glacial acetic acid and 0.6 of platinum dioxide.

(4) 1,2,3,4-tetrahydro-1,1-dimethylisoquinoline: A mixture containing 84.0 g. of benzyl iodide, 300 ml. of acetonitrile and 54.5 g. of 3,4-dihydro-1-methylisoquinoline was refluxed with stirring for six hours under anhydrous conditions. The solvent was distilled off in vacuo and the residual oil was treated with ether and the mixture heated with acetonitrile. On cooling the solution the separate yellow crystalline mixture which was collected was washed with ether in acetonitrile to yield 60 g. of 2-benzyl-3,4-dihydro-1-methylisoquinolinium iodide, M.P. 185–187° C. To a suspension containing 59.0 g. of 2-benzyl-3,4-dihydro-1-methylisoquinolinium iodide and 550 ml. of ether was added with stirring under an atmosphere of nitrogen 218 ml. of 3 M methyl magnesium bromide in ethyl ether at such a rate that gentle reflux was maintained throughout the addition. After completion of the addition (about forty-five minutes), the reaction mixture was stirred at reflux on a steam bath for four hours; it was then cooled with stirring and to the cooled mixture was added a solution containing 54 g. of ammonium chloride in 300 ml. of water to hydrolyze the complex and decompose the excess Grignard reagent. An emulsion formed and was filtered through a pad of infusorial earth and the filter pad containing the precipitate was washed with ether. The original filtrate and ether washings were combined and the ether layer separated. The remaining aqueous layer was extracted with ether, and the ether layer and ether extract combined. The ether solution was washed with water, dried over anhydrous magnesium sulfate and heated in vacuo to yield, as a yellow oil, 31.0 g. of 2-benzyl-1,2,3,4-tetrahydro-1,1-dimethylisoquinoline. A mixture containing 27.0 g. 2 - benzyl-1,2,3,4-tetrahydro-1,1-dimethylisoquinoline, 100 ml. of glacial acetic acid and 3.0 g. of 10% palladium-on-charcoal was hydrogenated. The reaction mixture was filtered to remove the catalyst and the filtrate heated under reduced pressure to remove the solvent. The resulting residue was treated wtih a mixture of ice and water, and the mixture made basic with 35% aqueous sodium hydroxide solution. The milky suspension was extracted three times with ether; the ether extracts were combined, washed with water and dried over anhydrous magnesium sulfate; and, the ether solution heated in vacuo to remove the ether and to yield 17.4 g. of an oil which was distilled under reduced pressure to yield, as a colorless oil, 12.53 g. of 1,2,3,4-tetrahydro-1,1-dimethylisoquinoline, B.P. 125–126° C. at 23 mm.

(5) 1,2,3,4 - tetrahydro - 1 - trifluoromethylisoquinoline: To a solution containing 36.3 g. of phenethylamine in 250 ml. of pyridine chilled to a temperature of about −5 to −10° C. was added over a period of forty-five minutes 69.3 g. of trifluoroacetic anhydride. The reaction mixture was allowed to warm slowly to room temperature and then cooled again to about −10° C. It was then poured with stirring onto 500 g. of ice and 250 ml. of hydrochloric acid. The mixture was extracted three times with ether and the ether extract washed successively three times with 3 N hydrochloric acid and once with brine. The ether solution was then dried over anhydrous magnesium sulfate and evaporated in vacuo to yield, as an oil, 62.3 g. of N-(phenethyl)-trifluoroacetamide. A portion of the oily material was crystallized from n-hexane as yellow flakes melting at 52–53° C. The n-(phenethyl) trifluoroacetamide (61 g.) was first converted to 3,4-dihydro - 1 - trifluoromethylisoquinoline as in Example A–1 using 120 ml. of phosphorus oxychloride and 100 g. of phosphorus pentoxide and said 3,4-dihydro-1-trifluoromethyl compound was then hydrogenated as in Example A–1 using 2 g. of platinum dioxide to yield, as a pale yellow oil, 42.1 g. of 1,2,3,4 - tetrahydro - 1 - trifluoromethylisoquinoline, B.P. 114–115° C. at 20 mm. A 9.2 g. portion of 1,2,3,4 - tetrahydro - 1 - trifluoromethylisoquinoline was dissolved in 250 ml. of ether and the solution was saturated with dry hydrogen chloride. The resulting gummy precipitate was triturated until solid, stirred in the ether for an hour, collected, washed with fresh ether and dried in vacuo at 45° C. to yield 10.4 g. of 1,2,3,4 - tetrahydro - 1 - trifluoromethylisoquinoline hydrochloride, M.P. 180–183° C.

(6) 5 - acetamido - 1,2,3,4 - tetrahydroisoquinoline: To 10 g. of 5-aminoisoquinoline was added 25 ml. of acetic anhydride whereupon heat evolved. The mixture was allowed to cool to room temperature whereupon solidification resulted. The solid was dissolved in 100 ml. of hot methanol and the methanol removed in vacuo. To the residue was added ice and an excess of 10% aqueous sodium hydroxide. The alkaline mixture was extracted three times with chloroform. The chloroform solution was dried over anhydrous magnesium sulfate and the chloroform then distilled off to yield 12.6 g. of 5-acetamidoisoquinoline. The 12.6 g. of 5-acetamidoisoquinoline was dissolved in 100 ml. of glacial acetic acid and hydrogenated in the presence of 0.8 g. of platinum dioxide. The reaction mixture was filtered and the filtrate heated in vacuo to remove the acetic acid. The residue was dissolved in water and the aqueous solution was made basic with 10% aqueous sodium hydroxide solution. The alkaline mixture was extracted with chloroform, the chloroform solution dried over anhydrous magnesium sulfate and the chloroform solution evaporated in vacuo to yield 8.9 g. of solid which was recrystallized from methylene dichloride-ether and dried at 45° C., in vacuo to yield 4.33 g. of 5-acetamido-1,2,3,4-tetrahydroisoquinoline, M.P. 150–153° C.

(7) 1,2,3,4 - tetrahydro - 4,4 - dimethylisoquinoline: To 82.5 g. of 2 - methyl - 2 - phenylpropylamine was carefully added with stirring and cooling 150 ml. of 98–100% of formic acid. The reaction mixture was heated at reflux with stirring for about thirty minutes and cooled. The formic acid was distilled off in vacuo and the residue was heated in vacuo at about 210° C. for three hours and allowed to cool. The residue was then dissolved in 200 ml. of ether and the solution cooled. The resulting crystalline precipitate was collected and dried over phosphorus pentoxide to yield 56.0 g. of N - (2 - methyl-2-phenylpropyl)formamide, M.P. 63–64° C. A 17.7 g. portion of N-(2 - methyl - 2 - phenylpropyl)formamide was converted to 14.8 g. of 3,4-dihydro - 4,4 - dimethylisoquinoline as follows: In a flask equipped with a stirrer and water condenser topped with a calcium chloride drying tube was heated at 160–165° C. under an atmosphere of nitrogen for seven hours a stirred mixture containing 17.7 g. of N - (2 - methyl - 2 - phenylpropyl)formamide and 210 g. of polyphosphoric acid containing additional phosphorus pentoxide [prepared by heating on a steam bath for twenty-five hours in a round bottom flask protected by a drying tube a mixture containing five parts of polyphosphoric acid and one part of phosphorus pentoxide]. The reaction mixture was cooled in an ice bath and treated carefully while stirring with about 30 ml. of a mixture of ice and water. The mixture was stirred for one hour and then added to about 500 ml. of ice and water. The mixture was extracted with ether and the ether washings discarded. The acidic mixture was then made alkaline with aqueous potassium hydroxide solution prepared from 280 g. of potassium hydroxide in 400 ml. of water. The milky suspension was extracted twice with ether; the ether extract dried over anhydrous sodium sulfate; and the ether distilled off in vacuo to yield, as an oil, 14.8 g. of 3,4-dihydro - 4,4 - dimethylisoquinoline. A 40.0 g. portion of 3,4-dihydro - 4,4 - dimethylisoquinoline was catalytically hydrogenated to yield 38.5 g. of 1,2, 3,4-tetrahydro - 4,4 - dimethylisoquinoline following the procedure described in Example A–1 using glacial acetic acid to a total reaction volume of 200 ml. and 2.4 g. of platinum dioxide.

(8) 1,2,3,4-tetrahydro-5-hydroxyisoquinoline: A 25 g. portion of 5-hydroxyisoquinoline in 200 ml. of glacial acetic acid was catalytically hydrogenated at room temperature using 1.0 g. of platinum dioxide. The reaction mixture was filtered and the filtrate was concentrated by heating in vacuo to yield a dark solid. The solid was boiled with 800 ml. of absolute ethanol under reflux for one hour; the hot mixture was filtered through a sintered glass funnel; and, the filtrate was cooled in ice and then allowed to stand at room temperature for three days. The resulting crystalline product was collected to yield 21.2 g. of 1,2, 3,4-tetrahydro-5-hydroxyisoquinoline as its acetate salt, which began to melt at about 185° C., resolidified and then finally melted at about 245° C.

(9) 1,2,3,4-tetrahydro-4-hydroxy-3,3-dimethylisoquinoline: In a 2 liter 3-necked flask provided with a stirrer, a Soxhlet apparatus joined to a water condenser topped with a calcium chloride drying tube and a dropping funnel was placed a suspension of 7.6 g. of lithium aluminum hydride in 100 ml. of ether. In the Soxhlet thimble was placed 18.0 g. of 1,2,3,4-tetrahydro-4-hydroxy-3,3-dimethyl-1-isoquinoline. To the stirred lithium aluminum hydride suspension was added a solution containing 54.0 g. anhydrous aluminum chloride in 250 ml. of ether. After addition had been completed, the reaction mixture was refluxed with stirring for seventeen hours. The reaction mixture was then cooled, treated dropwise with water until all of the excess lithium aluminum hydride was decomposed, and then treated with 200 ml. of 3 N aqueous sodium hydroxide solution followed by 35% aqueous sodium hydroxide solution. The mixture was next transferred to a separatory funnel and the two layers separated. The aqueous layer was filtered through infusorial earth and the filtrate was extracted with ether. The original ether fraction was combined with the ether extracts, was washed with water (twice) and then extracted with 400 ml. of 3 N hydrochloric acid. The ether layer was heated in vacuo to yield a small amount of material which was discarded. The aqueous acidic fraction was made distinctly alkaline with 35% aqueous sodium hydroxide solution and extracted with ether. The ether extract was dried over anhydrous magnesium sulfate and heated in vacuo to remove the ether and to yield a viscous oil which solidified. The solid was dissolved in 40 ml. of chloroform treated with 500 ml. of ether and the solution cooled. The resulting crystalline product was collected and dried in vacuo to yield 3.6 g. of 1,2,3,4-tetrahydro-4-hydroxy-3,3-dimethylisoquinoline, M.P. 124–126° C. A second crop of 1.8 g. of the product, M.P. 122–125° C., separated from from the mother liquor.

(10) 1,2,3,4 - tetrahydro - 1,3,3 - trimethylisoquinoline: This compound was prepared by catalytic reduction of 3-bromomethyl-3,4-dihydro-1,3-dimethylisoquinoline, a known compound, which in turn was prepared as follows: To 250 ml. of stirred acetonitrile cooled to −10° C. was added dropwise under anhydrous conditions 49.5 ml. of stannic chloride. To the resulting slurry was added dropwise 26.4 g. of 2-methallylbenzene followed by dropwise addition of 9.9 ml. of bromine. The stirred reaction mixture was kept at −10° C. for one hour and then was refluxed for eight hours. The cooled reaction mixture was heated in vacuo to remove the solvent. The residual gummy material was dissolved in ether and dilute aqueous hydrochloric acid. The layers were separated and the acid layer was washed with ether and made basic with 35% aqueous sodium hydroxide solution. The resulting yellow oil was taken up in ether; the ether extract was dried over anhydrous sodium sulfate and heat in vacuo to remove the ether and to yield, as a viscous oil, 34.7 g. of 3-bromomethyl-3,4-dihydro-1,3-dimethylisoquinoline. In a hydrogenation bottle was placed a mixture containing 25.2 g. of 3-bromomethyl-3,4-dihydro-1,3-dimethylisoquinoline, 40 ml. of 3 N aqueous sodium hydroxide solution, 8.0 g. of Raney nickel and sufficient ethanol to yield a volume of 200 ml. The resulting mixture was then catalytically hydrogenated, the catalyst filtered off through a pad of infusorial earth and the filtrate heated in vacuo to remove the solvent. The residual material was added to about 200 ml. of ice and water and the aqueous material extracted twice with ether. The ether extract was dried over anhydrous magnesium sulfate and heated in vacuo to remove the ether thereby yielding 14.4 g. of 1,2,3,4-tetrahydro-1,3,3-trimethylisoquinoline. This 14.4 g. of compound was combined with another 10.2 g. of the same compound prepared in the same manner and the combination was distilled under reduced pressure to yield 18.1 g. of 1,2,3,4-tetrahydro-1,3,3-trimethylisoquinoline, B.P. 102–103° C. at 9 mm.

(11) 1 - ethyl - 1,2,3,4 - tetrahydro - 1 - methylisoquinoline is prepared in three steps following the procedure described in Example A–4 starting with a molar equivalent quantity of 1-ethyl-3,4-dihydro-1-methylisoquinoline in place of 3,4-dihydro-1-methylisoquinoline and successively obtaining 2-benzyl-1-ethyl-3,4-dihydro-1-methylisoquinolinium iodide,
2-benzyl-1-ethyl-1,2,3,4-tetrahydro-1-methylisoquinoline and then
1-ethyl-1,2,3,4-tetrahydro-1-methylisoquinoline.

(12) 1 - n - butyl - 1,2,3,4 - tetrahydro - 1 - methylisoquinoline is prepared in three steps following the procedure described in Example A–4 starting with a molar equivalent quantity of 1-n-butyl-3,4-dihydro-1-methylisoquinoline in place of 3,4-dihydro-1-methylisoquinoline and successively obtaining 2-benzyl-1-n-butyl-3,4-dihydro-1-methylisoquinolinium iodide,
2-benzyl-1-n-butyl-1,2,3,4-tetrahydro-1-methylisoquinoline and then
1-n-butyl-1,2,3,4-tetrahydro-1-methylisoquinoline.

(13) 1,1-diethyl-1,2,3,4-tetrahydroisoquinoline is prepared in three steps following the procedure described in Example A–4 starting with a molar equivalent quantity of 1-ethyl-3,4-dihydroisoquinoline in place of 3,4-dihydro-1-methylisoquinoline and successively obtaining 2-benzyl-1-ethyl-3,4-dihydroisoquinolinium iodide, 2-benzyl-1,2,3,4-tetrahydro-1,1-diethylisoquinoline (using ethyl magnesium bromide in place of methyl magnesium bromide) and then 1,1-diethyl-1,2,3,4-tetrahydroisoquinoline.

(14) 1,2,3,4-tetrahydro-1,1,3-trimethylisoquinoline is prepared in three steps following the procedure described in Example A–4 starting with a molar equivalent quantity of 3,4-dihydro-1,3-dimethylisoquinoline in place of 3,4-dihydro-1-methylisoquinoline and successively obtaining 2-benzyl-3,4-dihydro-1,3-dimethylisoquinolinium iodide,
2-benzyl-1,2,3,4-tetrahydro-1,1,3-trimethylisoquinoline and
1,2,3,4-tetrahydro-1,1,3-trimethylisoquinoline.

(15) 1,2,3,4-tetrahydro - 1,1,4 - trimethylisoquinoline is prepared in three steps following the procedure described in Example A–4 starting with a molar equivalent quantity of 3,4-dihydro-1,4-dimethylisoquinoline in place of 3,4-dihydro-1-methylisoquinoline and successively obtaining 2-benzyl-3,4-dihydro-1,4-dimethylisoquinolinium iodide,
2-benzyl-1,2,3,4-tetrahydro-1,1,4-trimethylisoquinoline and
1,2,3,4-tetrahydro-1,1,4-trimethylisoquinoline.

(16) 1,2,3,4 - tetrahydro-1,1,5-trimethylisoquinoline is prepared in three steps following the procedure described in Example A–4 starting with a molar equivalent quantity of 3,4-dihydro-1,5-dimethylisoquinoline in place of 3,4-dihydro - 1 - methylisoquinoline and successively obtaining 2-benzyl-3,4-dihydro-1,5-dimethylisoquinolinium iodide,
2-benzyl-1,2,3,4-tetrahydro-1,1,5-trimethylisoquinoline and
1,2,3,4-tetrahydro-1,1,5-trimethylisoquinoline.

(17) 1,2,3,4-tetrahydro - 6 - methoxy-1,1-dimethylisoquinoline is prepared in three steps following the procedure described in Example A–4 starting with 3,4-dihydro-6-methoxy-1-methylisoquinoline and successively obtaining 2-benzyl-3,4-dihydro-6-methoxy-1-methylisoquinolinium iodide,
2-benzyl-1,2,3,4-tetrahydro-6-methoxy-1,1-dimethylisoquinoline and then
1,2,3,4-tetrahydro-6-methoxy-1,1-dimethylisoquinoline.

(18) 1,2,3,4-tetrahydro - 6 - isopropyl-1,1-dimethylisoquinoline is prepared in three steps following the procedure described in Example A–4 starting with 3,4-dihydro-6-isopropyl-1-methylisoquinoline and successively obtaining 2-benzyl-3,4-dihydro-6-isopropyl-1-methylisoquinolinium iodide,
2-benzyl-1,2,3,4-tetrahydro-6-isopropyl-1,1-dimethylisoquinoline and then
1,2,3,4-tetrahydro-6-isopropyl-1,1-dimethylisoquinoline.

(19) 1,2,3,4-tetrahydro - 7 - methoxy-1,1-dimethylisoquinoline is prepared in three steps following the procedure described in Example A–4 starting with 3,4-dihydro-7-methoxy-1-methylisoquinoline and successively obtaining 2-benzyl-3,4-dihydro-7-methoxy-1-methylisoquinolinium iodide,
2-benzyl-1,2,3,4-tetrahydro-7-methoxy-1,1-dimethylisoquinoline and then
1,2,3,4-tetrahydro-7-methoxy-1,1-dimethylisoquinoline.

(20) 1,2,3,4 - tetrahydro-5,6-dimethoxy-1,1-dimethylisoquinoline is prepared in three steps following the procedure described in Example A–4 starting with 3,4-dihydro-5,6-dimethoxy-1-methylisoquinoline and successively obtaining 2-benzyl-3,4-dihydro-5,6-dimethoxy-1-methylisoquinolinium iodide,
2-benzyl-1,2,3,4-tetrahydro-5,6-dimethoxy-1,1-dimethylisoquinoline and then
1,2,3,4-tetrahydro-5,6-dimethoxy-1,1-dimethylisoquinoline.

(21) 1,2,3,4-tetrahydro - 7 - n - hexyloxy-6-methoxy-1,1-dimethylisoquinoline is prepared in three steps following the procedure described in Example A–4 starting with 3,4-dihydro-7-n-hexyloxy-6-methoxy - 1 - methylisoquinoline and successively obtaining 2-benzyl-3,4-dihydro-7-n-hexyloxy - 6 - methoxy-1-methylisoquinolinium iodide,
2-benzyl-1,2,3,4-tetrahydro-7-n-hexyloxy-6-methoxy-1,1-dimethylisoquinoline and then
1,2,3,4-tetrahydro-7-n-hexyloxy-6-methoxy-1,1-dimethylisoquinoline.

(22) 1,2,3,4-tetrahydro - 6,7 - dimethoxy - 1,1 - dimethylisoquinoline is prepared in three steps following the procedure described in Example A–4 starting with 3,4-dihydro-6,7-dimethoxy - 1 - methylisoquinoline and successively obtaining 2-benzyl-3,4-dihydro-6,7-dimethoxy-1-methylisoquinolinium iodide,
2-benzyl-1,2,3,4-tetrahydro-6,7-dimethoxy-1,1-dimethylisoquinoline and then
1,2,3,4-tetrahydro-6,7-dimethoxy-1,1-dimethylisoquinoline.

(23) 7-chloro - 1,2,3,4 - tetrahydro - 1,4,4 - trimethylisoquinoline is prepared in four steps following the procedure described in Example A–3 starting with a molar equivalent quantity of 4-chlorophenylacetonitrile in place of phenylacetonitrile and successively obtaining 4-chloro-α,α-dimethylphenylacetonitrile,
N-[2-methyl-2-(4-chlorophenyl)propyl]acetamide,
7-chloro-3,4-dihydro-1,4,4-trimethylisoquinoline and then
7-chloro-1,2,3,4-tetrahydro-1,4,4-trimethylisoquinoline.

(24) 6,7,8-trimethoxy - 1,2,3,4 - tetrahydro-1,4,4-trimethylisoquinoline is prepared in four steps following the procedure described in Example A–3 starting with a molar equivalent quantity of 3,4,5-trimethoxyphenylacetonitrile in place of phenylacetonitrile and successively obtaining 3,4,5-trimethoxy-α,α-dimethylphenylacetonitrile,
N-[2-methyl-2-(3,4,5-trimethoxyphenyl)propyl]acetamide,
6,7,8-trimethoxy-3,4-dihydro-1,4,4-trimethylisoquinoline and then
6,7,8-trimethoxy-1,2,3,4-tetrahydro-1,4,4-trimethylisoquinoline.

(25) 6-bromo - 1,2,3,4 - tetrahydro - 1,4,4 - trimethylisoquinoline is prepared in four steps following the procedure described in Example A–3 starting with a molar equivalent quantity of 3-bromophenylacetonitrile in place of phenylacetonitrile and successively obtaining 3-bromo-α,α-dimethylphenylacetonitrile,
N-[2-methyl-2-(3-bromophenyl)propyl]acetamide,
6-bromo-3,4-dihydro-1,4,4-trimethylisoquinoline and then
6-bromo-1,2,3,4-tetrahydro-1,4,4-trimethylisoquinoline.

(26) 1,2,3,4-tetrahydro - 1,4,4,7 - tetramethylisoquinoline is prepared in four steps following the procedure described in Example A–3 starting with a molar equivalent quantity of 4-methylphenylacetonitrile in place of phenylacetonitrile and successively obtaining 4-methyl-α,α-dimethylphenylacetonitrile,
N-[2-methyl-2-(4-methylphenyl)propyl]acetamide,
3,4-dihydro-1,4,4,7-tetramethylisoquinoline and then
1,2,3,4-tetrahydro-1,4,4,7-tetramethylisoquinoline.

(27) 7-ethoxy - 1,2,3,4 - tetrahydro - 1,4,4 - trimethylisoquinoline is prepared in four steps following the procedure described in Example A–3 starting with a molar equivalent quantity of 4-ethoxyphenylacetonitrile in place of phenylacetonitrile and successively obtaining 4-ethoxy-α,α-dimethylphenylacetonitrile,
N-[2-methyl-2-(4-ethoxyphenyl)propyl]acetamide,
7-ethoxy-3,4-dihydro-1,4,4-trimethylisoquinoline and then
7-ethoxy-1,2,3,4-tetrahydro-1,4,4-trimethylisoquinoline.

(28) 7-ethoxy-1,2,3,4 - tetrahydro - 6 - methoxy-1,4,4-trimethylisoquinoline is prepared in four steps following the procedure described in Example A-3 starting with a molar equivalent quantity of 4-ethoxy-3-methoxyphenylacetonitrile in place of phenylacetonitrile and successively obtaining 4-ethoxy-3-methoxy-α,α-dimethylphenylacetonitrile,
N-[2-methyl-2-(4-ethoxy-3-methoxyphenyl)propyl]
  acetamide,
7-ethoxy-1,3,4-dihydro-6-1,4,4-trimethylisoquinoline and then
7-ethoxy-1,2,3,4-tetrahydro-6-methoxy-1,4,4-trimethylisoquinoline.

(29) 6,7 - diethoxy - 1,2,3,4-tetrahydro-1,4,4-trimethylisoquinoline is prepared in four steps following the procedure described in Example A-3 starting with a molar equivalent quantity of 3,4-diethoxyphenylacetonitrile in place of phenylacetonitrile and successively obtaining 3,4-diethoxy-α,α-dimethylphenylacetonitrile,
N-[2-methyl-2-(3,4-diethoxyphenyl)propyl]acetamide,
6,7-diethoxy-3,4-dihydro-1,4,4-trimethylisoquinoline and then
6,7-diethoxy-1,2,3,4-tetrahydro-1,4,4-trimethylisoquinoline.

(30) 1,2,3,4 - tetrahydro - 6,7 - dihydroxy-1,1-dimethylisoquinoline is prepared following the procedure described in Example A-2 using 1,2,3,4-tetrahydro-6,7-dimethoxy-1,1-dimethylisoquinoline and hydrobromic acid.

(31) 1,2,3,4 - tetrahydro - 7 - hydroxy-1,1-dimethylisoquinoline is prepared following the procedure described in Example A-2 using 1,2,3,4-tetrahydro-7-methoxy-1,1-dimethylisoquinoline and hydrobromic acid.

(32) 1,2,3,4 - tetrahydro - 7 - methoxy - 1 - methyl-isoquinoline: To refluxing benzene (500 ml.) were added dropwise and simultaneously 68 g. of 3-methoxybenzaldehyde and 52.0 g. of aminoacetaldehyde dimethyl acetal and the resulting mixture was refluxed until no more water was collected in a continuous separator connected to the apparatus. The benzene was removed by distilling in vacuo and the residue was diluted to a volume of about 500 ml. with dry ether. The ether solution containing N-(3-methoxybenzal)aminoacetaldehyde dimethyl acetal was added dropwise to a stirred solution containing 500 ml. of 3 M methyl magnesium bromide in 500 ml. of dry ether. The reaction mixture was refluxed for twenty hours, cooled and treated with a solution containing 160 g. of ammonium chloride in 1500 ml. of water. The ether layer was separated and dried over a mixture of anhydrous magnesium sulphate and anhydrous potassium carbonate. The dried solution was heated in vacuo to remove the ether, thereby yielding, as a pale yellow oil, 113 g. of N-(3-methoxy-α-methylbenzyl)aminoacetaldehyde dimethyl acetal. A 30.0 g. portion of N-(3-methoxy-α-methylbenzyl)aminoacetaldehyde dimethyl acetal was mixed with 250 ml. of 6 N hydrochloric acid, the mixture was extracted with ether, allowed to stand at ambient temperature (about 25-30° C.) for seventeen hours, and placed in a rotary evaporator at 35° C. for one hour to remove any ether. The resulting 1,2-dihydro-7-methoxy-1-methylisoquinoline in the acidic aqueous solution was catalytically hydrogenated at 35° C. over 3.5 g. of 10% palladium-on-charcoal. The reaction mixture was filtered, and the filtrate washed with 35% aqueous sodium hydroxide solution and extracted with chloroform. The chloroform solution was dried over anhydrous magnesium sulphate and evaporated in vacuo to remove the chloroform. The residual material was distilled under reduced pressure to yield 18 g. of 1,2,3,4-tetrahydro-7-methoxy-1-methyl-isoquinoline, B.P. 101-102° C. at 0.05 mm.

(33) 1,2,3,4 - tetrahydro - 1,7 - dimethylisoquinoline: To 31.2 g. of 2-(4-methylphenyl)ethylamine was added 100 ml. of acetic anhydride and the reaction mixture was heated in vacuo to remove the excess anhydride and acetic acid formed by the reaction, thereby yielding as a solid N-[2-(4-methylphenyl)ethyl]acetamide. Said solid acetamide was then heated with stirring for ninety minutes at reflux with 100 ml. of phosphorus oxychloride and 80 g. of phosphorous pentoxide. The excess phosphorus oxychloride was distilled off in vacuo and to the remaining material was added 800 ml. of ice and water. The resulting mixture was stirred for about thirty minutes and then washed with ether. The aqueous mixture was chilled in ice and to it was added with cooling excess 35% aqueous sodium hydroxide solution. The resulting alkaline mixture was extracted with chloroform. The chloroform extract was dried over anhydrous sodium sulfate and evaporated to remove the chloroform and to yield as an oil 33.6 g. of 3,4-dihydro-1,7-dimethylisoquinoline. The 33.6 g. of 3,4-dihydro-1,7-dimethylisoquinoline was dissolved in acetic acid (total volume of 200 ml.) and catalytically hydrogenated over 0.8 g. of platinum dioxide as in Example A-1 to yield 23.4 g. of 1,2,3,4-tetrahydro-1,7-dimethylisoquinoline, B.P. 144-146° C. at 23 mm.

(34) 1,2,3,4 - tetrahydro - cis - 1,3-dimethylisoquinoline was prepared following the three-step procedure described in Example A-33 starting with 50 g. of dextroamphetamine (d-α-methylphenethylamine) and 200 ml. of acetic anhydride to yield N-(α-methylphenethyl)acetamide, reacting the latter with 120 ml. of phosphorus oxychloride and 120 g. phosphorus pentoxide as in Example A-33 to yield as an oil 43 g. of 3,4-dihydro-1,3-dimethylisoquinoline, and catalytically hydrogenating a 15.9 g. portion of 3,4-dihydro-1,3-dimethylisoquinoline over 0.8 g. of 10% palladium-on-charcoal in glacial acetic acid (total volume of 100 ml.) and a 29.4 g. portion of 3,4-dihydro-1,3-dimethylisoquinoline over 0.5 g. of platinum dioxide in glacial acetic acid (total volume of 100 ml.) to yield 9.6 g. and 16.8 g. portions respectively of oily product which were combined and distilled under reduced pressure to yield 12 g. of (+)-1,2,3,4-tetrahydro-cis-1,3-dimethylisoquinoline, B.P. 125-130° C. at 23 mm., $[\alpha]_D^{25} = +115.4°$ (1% in chloroform).

(B) 3,4-DIHYDRO-2(1H)-ISOQUINOLINE-CARBONITRILES (1) 3,4 - dihydro-6-methoxy-1-methyl-2(1H)-isoquinolinecarbonitrile: To a cooled mixture containing 16.0 g. 1,2,3,4-tetrahydro-6-methoxy - 1 - methylisoquinoline, 14.8 g. of anhydrous sodium acetate and 125 ml. of anhydrous methanol was added dropwise with stirring, keeping the mixture below about 5° C., a solution of 10.5 g. of cyanogen bromide in 40 ml. of anhydrous methanol. The reaction mixture was stirred below 5° C. for about three hours and then allowed to stand at room temperature (about 25-30° C.) overnight. The reaction mixture was then heated in vacuo to remove the solvent; the residue was taken up in ether and water; and the layers were separated. The ether layer was washed successively with 2 N hydrochloric acid, water, aqueous sodium bicarbonate solution and water. The washed ether solution was dried over anhydrous potassium carbonate and concentrated in vacuo to remove the ether, thereby yielding, as a straw colored oil, 16.7 g. of 3,4-dihydro-6-methoxy-1-methyl-2(1H)-isoquinolinecarbonitrile.

(2) 3,4-dihydro-6-hydroxy-1-methyl-2(1H) - isoquinolinecarbonitrile, 25.5 g., was prepared as in Example B-1 using 37.0 g. of 1,2,3,4-tetrahydro-6 hydroxy-1-methylisoquinoline hydrobromide and 37.5 g. of anhydrous sodium acetate in 250 ml. of methanol, and 16.1 g. cyanogen bromide in 50 ml. methanol.

(3) 3,4 - dihydro-1,4,4-trimethyl-2(1H) - isoquinolinecarbonitrile, 27.3 g., as a pale yellow oil, was prepared as in Example B-1 using 22.5 g. of 1,2,3,4-tetrahydro-1,4,4-trimethylisoquinoline and 33 g. of anhydrous sodium acetate in 150 ml. of methanol, and 14.8 g. of cyanogen bromide in 50 ml. of methanol.

(4) 3,4 - dihydro-1,1-dimethyl-2(1H) - isoquinolinecarbonitrile, 9.2 g., as a pale yellow oil, was prepared as in Example B–1 using 12.0 g. of 1,2,3,4-tetrahydro-1,1-dimethylisoquinoline and 13.95 g. of anhydrous sodium acetate in 60 ml. of methanol, and 8.5 g. of cyanogen bromide in 40 ml. of methanol.

(5) 3,4 - dihydro - 1 - trifluoromethyl-2(1H)-isoquinolinecarbonitrile, 31.3 g., M.P. 81–82° C., was prepared as in Example B–1 using 28.7 g. of 1,2,3,4-tetrahydro-1-trifluoromethylisoquinoline and 32.8 g. of anhydrous sodium acetate in 190 ml. of methanol, and 21.2 g. of cyanogen bromide in 60 ml. of methanol.

(6) 5 - acetamido - 3,4-dihydro-2(1H)-isoquinolinecarbonitrile, 9.7 g., M.P. 193–194° C., was prepared as in Example B–1 using 17.2 g. of 5-acetamido-1,2,3,4-tetrahydroisoquinoline and 16.4 g. of anhydrous sodium acetate suspended in 100 ml. of methanol, and 9.5 g. of cyanogen bromide in 30 ml. of methanol.

(7) 3,4 - dihydro - 4,4 - dimethyl-2(1H)-isoquinolinecarbonitrile, 25.4 g., was prepared as in Example B–1 using 24.0 g. of 1,2,3,4-tetrahydro-4,4-dimethylisoquinoline and 29.8 g. of anhydrous sodium acetate in 250 ml. of methanol, and 17.0 g. of cyanogen bromide in 50 ml. of methanol.

(8) 3,4 - dihydro - 5 - hydroxy-2(1H)-isoquinolinecarbonitrile, 14.3 g., M.P. 143–145° C., was prepared as in Example B–1 using 20.9 g. of 1,2,3,4-tetrahydro-5-hydroxyisoquinoline acetate and 29 g. of anhydrous sodium acetate in 200 ml. of methanol, 12.7 g. of cyanogen bromide in 50 ml. of methanol, and crystallization from chloroform.

(9) 3,4 - dihydro - 4 - hydroxy-3,3-dimethyl-2(1H)-isoquinolinecarbonitrile, 2.35 g., M.P. 80–82° C., was prepared as in Example B–1 using 3.0 g. of 1,2,3,4-tetrahydro-4-hydroxy-3,3-dimethylisoquinoline and 4.1 g. of anhydrous sodium acetate in 80 ml. of methanol, 2.0 g. cyanogen bromide in 20 ml. of methanol.

(10) 3,4 - dihydro - 1,3,3 - trimethyl-2(1H)-isoquinolinecarbonitrile, 1.2 g. as a pale yellow viscous oil, was prepared as in Example B–1 using 1.75 g. of 1,2,3,4-tetrahydro-1,3,3-trimethylisoquinoline and 2.50 g. of anhydrous sodium acetate in 15 ml. of methanol, and 1.28 g. of cyanogen bromide in 10 ml. of methanol.

(11) 1 - ethyl - 3,4 - dihydro-1-methyl-2(1H)-isoquinolinecarbonitrile is prepared as in Example B–1 using 1-ethyl-1,2,3,4-tetrahydro-1-methylisoquinoline.

(12) 1 - n - butyl - 3,4 - dihydro-1-methyl-2(1H)-isoquinolinecarbonitrile is prepared as in Example B–1 using 1-n-butyl-1,2,3,4-tetrahydro-1-methylisoquinoline.

(13) 1,1 - diethyl - 3,4 - dihydro-2(1H)-isoquinolinecarbonitrile is prepared as in Example B–1 using 1,1-diethyl-1,2,3,4-tetrahydroisoquinoline.

(14) 3,4 - dihydro - 1,1,3 - trimethyl-2(1H)-isoquinolinecarbonitrile is prepared as in Example B–1 using 1,2,3,4-tetrahydro-1,1,3-trimethylisoquinoline.

(15) 3,4 - dihydro - 1,1,4 - trimethyl-2(1H)-isoquinolinecarbonitrile is prepared as in Example B–1 using 1,2,3,4-tetrahydro-1,1,4-trimethylisoquinoline.

(16) 3,4 - dihydro - 1,1,5 - trimethyl-2(1H)-isoquinolinecarbonitrile is prepared as in Example B–1 using 1,2,3,4-tetrahydro-1,1,5-trimethylisoquinoline.

(17) 3,4 - dihydro-6-methoxy-1,1-dimethyl-2(1H)-isoquinolinecarbonitrile is prepared as in Example B–1 using 1,2,3,4-tetrahydro-6-methoxy-1,1-dimethylisoquinoline.

(18) 3,4 - dihydro-6-isopropyl-1,1-dimethyl-2(1H)-isoquinolinecarbonitrile is prepared as in Example B–1 using 1,2,3,4-tetrahydro-6-isopropyl-1,1-dimethylisoquinoline.

(19) 3,4 - dihydro-7-methoxy-1,1-dimethyl-2(1H)-isoquinolinecarbonitrile is prepared as in Example B–1 using 1,2,3,4-tetrahydro-7-methoxy-1,1-dimethylisoquinoline.

(20) 3,4 - dihydro-5,6-dimethoxy-1,1-dimethyl-2(1H)-isoquinolinecarbonitrile is prepared as in Example B–1 using 1,2,3,4 - tetrahydro-5,6-dimethoxy-1,1-dimethylisoquinoline.

(21) 3,4 - dihydro-7-n-hexyloxy-6-methoxy-1,1-dimethyl-2(1H)-isoquinolinecarbonitrile is prepared as in Example B–1 using 1,2,3,4-tetrahydro-7-n-hexyloxy-6-methoxy-1,1-dimethylisoquinoline.

(22) 3,4 - dihydro-6,7-dimethoxy-1,1-dimethyl-2(1H)-isoquinolinecarbonitrile is prepared as in Example B–1 using 1,2,3,4 - tetrahydro-6,7-dimethoxy-1,1-dimethylisoquinoline.

(23) 7 - chloro - 3,4 - dihydro-1,4,4-trimethyl-2(1H)-isoquinolinecarbonitrile is prepared as in Example B–1 using 7 - chloro-1,2,3,4-tetrahydro-1,4,4-trimethylisoquinoline.

(24) 6,7,8 - trimethoxy - 3,4 - dihydro-1,4,4-trimethyl-2(1H)-isoquinolinecarbonitrile is prepared as in Example B–1 using 6,7,8 - trimethoxy-1,2,3,4-tetrahydro-1,4,4-trimethylisoquinoline.

(25) 6 - bromo - 3,4 - dihydro-1,4,4-trimethyl-2(1H)-isoquinolinecarbonitrile is prepared as in Example B–1 using 6 - bromo - 1,2,3,4-tetrahydro-1,4,4-trimethylisoquinoline.

(26) 3,4 - dihydro - 1,4,4,7 - tetramethyl-2(1H)-isoquinolinecarbonitrile is prepared as in Example B–1 using 1,2,3,4-tetrahydro-1,4,4,7-tetramethylisoquinoline.

(27) 7 - ethoxy - 3,4 - dihydro - 1,4,4-trimethyl-2(1H)-isoquinolinecarbonitrile is prepared as in Example B–1 using 7 - ethoxy - 1,2,3,4-tetrahydro-1,4,4-trimethylisoquinoline.

(28) 7 - ethoxy - 3,4 - dihydro - 6 - methoxy - 1,4,4-trimethyl - 2(1H) - isoquinolinecarbonitrile is prepared as in Example B–1 using 7-ethoxy-1,2,3,4-tetrahydro-6-methoxy-1,4,4-trimethylisoquinoline.

(29) 6,7 - diethoxy - 3,4 - dihydro - 1,4,4 - trimethyl-2(1H)-isoquinolinecarbonitrile is prepared as in Example B–1 using 6,7 - diethoxy - 1,2,3,4 - tetrahydro - 1,4,4-trimethylisoquinoline.

(30) 3,4 - dihydro - 6,7 - dihydroxy - 1,1 - dimethyl-2(1H)-isoquinolinecarbonitrile is prepared as in Example B–1 using 1,2,3,4 - tetrahydro - 6,7 - dihydroxy - 1,1-dimethylisoquinoline.

(31) 3,4 - dihydro - 7 - hydroxy - 1,1 - dimethyl-2(1H)-isoquinolinecarbonitrile is prepared as in Example B–1 using 1,2,3,4 - tetrahydro - 7 - hydroxy - 1,1 - dimethylisoquinoline.

(32) 3,4 - dihydro - 7 - methoxy - 1 - methyl - 2(1H)-isoquinolinecarbonitrile, 17.4 g. as a yellow oil, was obtained following the procedure described in Example B–1 using 16.5 g. of 1,2,3,4 - tetrahydro - 7 - methoxy - 1-methylisoquinoline and 24.6 g. of anhydrous sodium acetate in 100 ml. of methanol and 11.6 g. of cyanogen bromide in 30 ml. of methanol. A small sample was found to distill at 130–134° C. at 0.03–0.08 mm.

(33) 3,4 - dihydro - 1,7 - dimethyl - 2(1H) - isoquinolinecarbonitrile, 26.1 g. as a pale yellow oil was obtained following the procedure described in Example B–1 using 23.4 g. of 1,2,3,4 - tetrahydro - 1,7 - dimethylisoquinoline and 41 g. of anhydrous sodium acetate in 150 ml. of methanol, and 17 g. of cyanogen bromide in 80 ml. of methanol.

(34) 3,4 - dihydro - cis - 1,3 - dimethyl - 2(1H)-isoquonilinecarbonitrile, 13.7 g. as a pale yellow oil, was obtained following the procedure described in Example B–1 using 12 g. of (+)-1,2,3,4-tetrahydro-cis-1,3-dimethylisoquinoline and 24.6 g. of anhydrous sodium acetate in 60 ml. of methanol, and 9.5 g. of cyanogen bromide in 40 ml. of methanol.

(35) 1 - ethyl - 3,4 - dihydro - 2(1H) - isoquinolinecarbonitrile, 26.7 g., was prepared as in Example B–1 using 22.6 g. of 1 - ethyl - 1,2,3,4 - tetrahydroisoquinoline and 23 g. of anhydrous sodium acetate in 150 ml. of methanol, and 16.2 g. of cyanogen bromide in 100 ml. of methanol. The above intermediate 1-ethyl-1,2,3,4-tetrahydroisoquinoline was prepared in three steps as follows: To 100 ml. of propionic anhydride was added with swirling 50.9 g. of 2-phenylethylamine and the hot solution was heated in vacuo at 25 mm. on a steam bath to remove the solvents. To the residue was added 400 ml.

of xylene which was then removed by heating in vacuo to yield N-(2-phenylethyl)propionamide which was dissolved in one liter of dry xylene and the solution treated with 120 ml. of phosphorus oxychloride, 120 g. of phosphorus pentoxide and 400 g. of sodium chloride. The resulting mixture was stirred and slowly heated to reflux over a period of one hour. The mixture was then refluxed for an hour. The mixture was allowed to cool to room temperature and the organic layer was decanted and discarded. To the residue was added with stirring a mixture of ice and water (total volume of about three liters in two portions). The aqueous mixture was extracted with ether and the extract discarded. To the aqueous solution chilled in an ice bath was added with stirring potassium hydroxide (about 250 g.). The strongly basic mixture was extracted with ether. The ether extract was dried over anhydrous potassium carbonate and evaporated in vacuo to remove the ether to yield, as an oil, 52 g. 1-ethyl-3,4-dihydroisoquinoline which was taken up in 150 ml. of glacial acetic acid, 1.5 g. of platinum dioxide added, and the mixture hydrogenated for about seven and one-half hours using an initial hydrogen pressure of 45 p.s.i. Since only about two-thirds of the theoretical amount of hydrogen had been taken up at this time, another 2 g. of platinum dioxide was added and hydrogenation was continued for an additional seven hours. The catalyst was filtered off and the filtrate concentrated in vacuo to remove the acetic acid. The residue was diluted with 500 ml. ice water and the mixture washed with ether and then made strongly basic with 35% anhydrous sodium hydroxide solution. The basic solution was extracted with ether. The ether extract was dried over anhydrous potassium carbonate, evaporated in vacuo to remove the ether and the remaining oil was distilled under reduced pressure to yield a fraction of 22.6 of 1-ethyl-1,2,3,4-tetrahydroisoquinoline, B.P. 142–143° C., at 27 mm.

(C) 3,4-DIHYDRO-2(1H)-ISOQUINOLINECARBOXAMIDOXIMES (1) 3,4 - dihydro - 6 - hydroxy - 1 - methyl - 2(1H)-isoquinolinecarboxamidoxime: To a solution containing 16.7 g. of hydroxylamine hydrochloride and 25.5 g. of 3,4 - dihydro - 6 - hydroxy - 1 - methyl - 2(1H) - isoquinolinecarbonitrile in 200 ml. of dimethylformamide was added over a ten minute period 47.6 g. of anhydrous sodium carbonate. The reaction mixture was heated on a steam bath for about seventy-five minutes, cooled to 50° C. and filtered to remove the white precipitate. The precipitate was washed with dimethylformamide and the filtrate plus the washings were concentrated in vacuo to remove all of the dimethylformamide. The residue was dissolved in ether and made acidic with hydrochloric acid in ether. The ether was decanted from the gummy precipitate an disopropyl alcohol added whereupon 3,4-dihydro - 6 - hydroxy - 1 - methyl - 2(1H) - isoquinolinecarboxamidoxime as its hydrochloride crystallized. The crystalline hydrochloride was dissolved in water and the solution made basic with aqueous sodium bicarbonate solution. The basic solution was cooled and the walls of the glass vessel were scratched with a glass rod whereupon the product crystallized. The crystals were collected and recrystallized from isopropyl alcohol to yield 5.4 g. of 3,4 - dihydro - 6 - hydroxy - 1 - methyl - 2(1H) - isoquinolinecarboxamidoxime.

(2) 3,4-dihydro - 1,4,4 - trimethyl-2(1H)-isoquinolinecarboxamidoxime: To a mixture containing 27.1 g. of 3,4 - dihydro - 1,4,4 - trimethyl-2(1H)-isoquinolinecarbonitrile, 14 g. of hydroxylamine hydrochloride and 120 ml. of dimethylformamide was carefully added with stirring over a two minute period 42.4 g. of anhydrous sodium carbonate. The reaction mixture was heated on a steam bath for one hour, filtered and the filtrate heated in vacuo to remove the solvent. The residue was taken up in ether and water, and the mixture shaken well. The ether layer was separated, washed twice with water and then extracted with 200 ml. of ice cold 2 N hydrochloric acid in three portions. The acidic extract was washed with ether and cooled below 20° C. followed by addition of 220 ml. of 2 N aqueous sodium hydroxide solution. The alkaline mixture was extracted three times with chloroform; the chloroform extract was dried over anhydrous magnesium sulfate and evaporated in vacuo to remove the chloroform. The glassy residue slowly crystallized and was recrystallized by dissolving it in 40 ml. of boiling methylene dichloride and slowly adding hot n-hexane. The mixture was cooled in ice; the precipitate was collected, washed with a cold layer of 20 ml. methylene dichloride and 50 ml. n-hexane, and dried in vacuo at 40° C. to yield 18.6 g. of 3,4-dihydro-1,4,4-trimethyl-2(1H)-isoquinolinecarboxamidoxime, M.P. 134–135° C.

(3) 3,4 - dihydro - 1,1 - dimethyl-2(1H)-isoquinolinecarboxamidoxime, 5.3 g., M.P. 161–162° C., was prepared following the procedure described in Example C–2 using 8.7 g. of 3,4-dihydro-1,1-dimethyl-2(1H)-isoquinolinecarbonitrile, 8.3 g. of hydroxylamine hydrochloride, 100 ml. of dimethylformamide, 25.4 g. of anhydrous sodium carbonate, a heating period of twenty-two hours, recrystallization from ethyl acetate and a second recrystallization from ethanol-n-hexane.

(4) 3,4 - dihydro-1-trifluoromethyl-2(1H)-isoquinolinecarboxamidoxime, M.P. 115–116° C., was prepared following the procedure described in Example C–2 using 29.2 g. of 3,4-dihydro-1-trifluoromethyl-2(1H)-isoquinolinecarbonitrile, 12.5 g. of hydroxylamine hydrochloride, 160 ml. of dimethylformamide, 42.4 g. of anhydrous sodium carbonate, a heating period of about three hours, and the following purification of the residue obtained by evaporating the chloroform extract: the 29.6 g. of a thick gummy residue, which slowly began to crystallize, was crystallized by dissolving it in 100 ml. of isopropyl alcohol and adding 150 ml. of n-hexane and dried in vacuo at 55° C. to yield 9.4 g. of 3,4-dihydro-1-trifluoromethyl-2(1H)-isoquinolinecarboxamidoxime, M.P. 115–116° C. The filtrate from the above recrystallization was concentrated to about one-half volume, cooled and treated with excess hydrogen chloride in ether followed by more ether and stirring until precipitation was complete (final volume of about 400 ml.). The precipitate was collected, washed with ether and dried at 40° C. in vacuo to yield 16.8 g. of 3,4-dihydro-1-trifluoromethyl-2(1H)-isoquinolinecarboxamidoxime hydrochloride, M.P. 203–207° C. with decomposition.

(5) 5 - acetamido - 3,4 - dihydro-2(1H)-isoquinolinecarboxamidoxime, also can be named as N-(1,2,3,4-tetrahydro-2-hydroxyamidino-5-isoquinolyl)acetamide, 20.5 g., M.P. 164–166° C., was prepared following the procedure described in Example C–2 using 33 g. of 5-acetamido-3,4-dihydro-2(1H)-isoquinolinecarbonitrile, 25 g. of hydroxylamine hydrochloride, 250 ml. of dimethylformamide, 100 g. of anhydrous sodium carbonate, a heating period of twenty-four hours, and crystallization from acetonitrile.

(6) 3,4 - dihydro - 4,4 - dimethyl-2(1H)-isoquinolinecarboxamidoxime, 8.5 g., M.P. 117–119° C., was prepared following the procedure described in Example C–2 using 24.0 g. of 3,4-dihydro-4,4-dimethyl-2(1H)-isoquinolinecarbonitrile, 28.8 g. of hydroxylamine hydrochloride, 250 ml. of dimethylformamide, 84.8 g. of anhydrous sodium carbonate, a heating period of two hours on a steam bath, and crystallization from chloroform-n-hexane and recrystallization from chloroform-n-hexane.

(7) 3,4 - dihydro - 5 - hydroxy-2(1H)-isoquinolinecarboxamidoxime, as its hydrochloride, 17.2 g., M.P. 204–205° C. with decomposition, was prepared following the procedure described in Example C–1 using 17.4 g. of 3,4-dihydro-5-hydroxy - 2(1H) - isoquinolinecarbonitrile, 14 g. of hydroxylamine hydrochloride, 150 ml. of dimethylformamide, 78 g. of anhydrous sodium carbonate and a heating period of twenty-nine hours.

(8) 3,4-dihydro-4-hydroxy - 3,3 - dimethyl-2(1H)-isoquinolinecarboxamidoxime, as an oil, 2.2 g., was prepared following the procedure described in Example C–1 using 5.4 g. of 3,4-dihydro-4-hydroxy-3,3-dimethyl-2(1H)-isoquinolinecarbonitrile, 6.95 g. of hydroxylamine hydrochloride, 100 ml. of dimethylformamide, 21.2 g. of anhydrous sodium carbonate, and a heating period of four hours. A 1.5 g. portion of this product was dissolved in acetone and the acetone solution treated with a solution containing cyclohexanesulfamic acid in ethanol. The resulting precipitate was collected, washed with anhydrous acetone and dried in vacuo at 50° C. for forty-eight hours to yield 1.62 g. of 3,4-dihydro-4-hydroxy-3,3-dimethyl-2(1H) - isoquinolinecarboxamidoxime cyclohexanesulfamate, M.P. 148–149° C.

(9) 3,4-dihydro - 1,3,3 - trimethyl-2(1H)-isoquinolinecarboxamidoxime, 0.2 g., M.P. 160–162° C., was prepared following the procedure described in Example C–1 using 1.2 g. of 3,4-dihydro-1,3,3-trimethyl-2(1H)-isoquinolinecarbonitrile, 6.95 g. of hydroxylamine hydrochloride, 35 ml. of anhydrous dimethylformamide, 21.2 g. of anhydrous sodium carbonate, stirring the reaction mixture at room temperature for twenty-four hours, adding another 10 ml. portion of dimethylformamide, stirring the reaction mixture for an additional twenty hours, working up the reaction as in Example C–1 and recrystallizing the product from ether-n-hexane.

(10) 1 - ethyl - 3,4 - dihydro -1-methyl-2(1H)-isoquinolinecarboxamidoxime is prepared as in Example C–1 using 1-ethyl-3,4-dihydro - 1 - methyl-2(1H)-isoquinolinecarbonitrile.

(11) 1-n-butyl - 3,4 - dihydro - 1 - methyl-2(1H)-isoquinolinecarboxamidoxime is prepared as in Example C–1 using 1-n-butyl-3,4-dihydro-1-methyl-2(1H)-isoquinolinecarbonitrile.

(12) 1,1-diethyl - 3,4 - dihydro - 2(1H) - isoquinolinecarboxamidoxime is prepared as in Example C–1 using 1,1-diethyl-3,4-dihydro-2(1H)-isoquinolinecarbonitrile.

(13) 3,4-dihydro - 1,1,3 - trimethyl-2(1H)-isoquinolinecarboxamidoxime is prepared as in Example C–1 using 3,4-dihydro-1,1,3-trimethyl - 2(1H) - isoquinolinecarbonitrile.

(14) 3,4-dihydro - 1,1,4 - trimethyl-2(1H)-isoquinolinecarboxamidoxime is prepared as in Example C–1 using 3,4-dihydro - 1,1,4 - trimethyl - 2(1H) - isoquinolinecarbonitrile.

(15) 3,4 - dihydro - 1,1,5 - trimethyl-2(1H)-isoquinolinecarboxamidoxime is prepared as in Example C–1 using 3,4 - dihydro - 1,1,5 - trimethyl - 2(1H)-isoquinolinecarbonitrile.

(16) 3,4 - dihydro - 6 - methoxy-1,1-dimethyl-2(1H)-isoquinolinecarboxamidoxime is prepared as in Example C–1 using 3,4-dihydro-6-methoxy-1,1-dimethyl-2(1H)-isoquinolinecarbonitrile.

(17) 3,4 - dihydro - 6 - isopropyl-1,1-dimethyl-2(1H)-isoquinolinecarboxamidoxime is prepared as in Example C–1 using 3,4 - dihydro-6-isopropyl-1,1-dimethyl-2(1H)-isoquinolinecarbonitrile.

(18) 3,4 - dihydro - 7 - methoxy-1,1-dimethyl-2(1H)-isoquinolinecarboxamidoxime is prepared as in Example C–1 using 3,4 - dihydro-7-methoxy-1,1-dimethyl-2(1H)-isoquinolinecarbonitrile.

(19) 3,4 - dihydro-5,6-dimethoxy-1,1-dimethyl-2(1H)-isoquinolinecarboxamidoxime is prepared as in Example C–1 using 3,4 - dihydro - 5,6-dimethoxy-1,1-dimethyl-2(1H)-isoquinolinecarbonitrile.

(20) 3,4 - dihydro - 7 - n-hexyloxy-6-methoxy-1,1-dimethyl-2(1H)-isoquinolinecarboxamidoxime is prepared as in Example C–1 using 3,4-dihydro-6,7-dimethoxy-1,1-dimethyl-2(1H)-isoquinolinecarbonitrile.

(21) 3,4 - dihydro-6,7-dimethoxy-1,1-dimethyl-2(1H)-isoquinolinecarboxamidoxime is prepared as in Example C–1 using 3,4-dihydro-6,7-dimethoxy-1,1-dimethyl-2(1H)-isoquinolinecarbonitrile.

(22) 7 - chloro - 3,4 - dihydro-1,4,4-trimethyl-2(1H)-isoquinolinecarboxamidoxime is prepared as in Example C–1 using 7-chloro-3,4-dihydro-1,4,-trimethyl-2(1H)- isoquinolinecarbonitrile.

(23) 6,7,8 - trimethoxy - 3,4-dihydro-1,4,4-trimethyl-2-(1H)-isoquinolinecarboxamidoxime is prepared as in Example C–1 using 6,7,8-trimethoxy-3,4-dihydro-1,4,4-trimethyl-2(1H)-isoquinolinecarbonitrile.

(24) 6 - bromo - 3,4-dihydro-1,4,4-trimethyl-2(1H)-isoquinolinecarboxamidoxime is prepared as in Example C–1 using 6-bromo-3,4-dihydro-1,4,4-trimethyl-2(1H)-isoquinolinecarbonitrile.

(25) 3,4 - dihydro - 1,4,4,7 - tetramethyl-2(1H)-iso quinolinecarboxamidoxime is prepared as in Example C–1 using 3,4-dihydro-1,4,4,7-tetramethyl-2(1H)-isoquinolinecarbonitrile.

(26) 7 - ethoxy-3,4-dihydro-1,4,4-trimethyl-2(1H)-isoquinolinecarboxamidoxime is prepared as in Example C–1 using 7 - ethoxy - 3,4-dihydro-1,4,4-trimethyl-2(1H)-isoquinolinecarbonitrile.

(27) 7 - ethoxy-3,4-dihydro-6-methoxy-1,4,4-trimethyl-2(1H) - isoquinolinecarboxamidoxime is prepared as in Example C–1 using 7-ethoxy-3,4-dihydro-6-methoxy1,4,4-trimethyl-2(1H)-isoquinolinecarbonitrile.

(28) 6,7 - diethoxy-3,4-dihydro-1,4,4-trimethyl-2(1H)-isoquinolinecarbaxamidoxime is prepared as in Example C–1 using 6,7 - diethoxy - 3,4-dihydro-1,4,4-trimethyl-2 (1H)-isoquinolinecarbonitrile.

(29) 3,4 - dihydro-6,7-dihydroxy-1,1-dimethyl-2(1H)-isoquinolinecarboxamidoxime is prepared as in Example C–1 using 3,4-dihydro-6,7-dihydroxy-1,1-dimethyl-2(1H)-isoquinolinecarbonitrile.

(30) 3,4 - dihydro-7-hydroxy-1,1-dimethyl-2(1H)-isoquinolinecarboxamidoxime is prepared as in Example C–1 using 3,4 - dihydro - 7-hydroxy-1,1-dimethyl-2(1H)-iso quinolinecarbonitrile.

(31) 3,4 - dihydro - 7 - methoxy-1-methyl-2(1H)-isoquinolinecarboxamidoxime, M.P. 136–139° C., 7.9 g., was prepared following the procedure described in Example C–2 using 9 g. of hydroxylamine hydrochloride, 26 g. of anhydrous sodium carbonate, 50 ml. of dimethylformamide and 15.6 g. of 3,4-dihydro-7-methoxy-1-methyl-2 (1H)-isoquinolinecarbonitrile.

(32) 3,4 - dihydro - 1,7-dimethyl-2(1H)-isoquinolinecarboxamidoxime, M.P. 151–154° C., 14.8 g., was prepared following the procedure described in Example C–2 using 25.3 g. of 3,4-dihydro-1,7-dimethyl-2(1H)-isoquinolinecarbonitrile, 14 g. of hydroxylamine hydrochloride, 150 ml. of dimethylformamide, 42.4 g. of anhydrous sodium carbonate, a heating period of two hours and crystallization from benzene.

(33) (—) - 3,4 - dihydro-cis - 1,3-dimethyl-2(1H)-isoquinolinecarboxamidoxime, M.P. 148–151° C., $[\alpha]_d^{25} = -18.8°$ (1% in chloroform), 4.6 g., was prepared following the procedure described in Example C–2 using 13.6 g. of 3,4 - dihydro - cis-1,3-dimethyl-2(1H)-isoquinolinecarbonitrile, 8.3 of hydroxylamine hydrochloride, 125 ml. of dimethylformamide, 25.4 g. of anhydrous sodium carbonate and crystallization from benzene.

(34) 1 - ethyl-3,4-dihydro-2(1H)-isoquinolinecarboxamidoxime: To a cooled suspension containing 50 g. of anhydrous soduim carbonate in 100 ml. of dimethylformamide was added in portions over a five minute period 17.4 g. of hydroxylamine hydrochloride and the resulting mixture was stirred for ten minutes. To the mitxure was added 26.3 g. of 1-ethyl-3,4-dihydro-2(1H)-isoquinecarbonitrile and 25 ml. of dimethylformamide. The resulting reaction mixture was stirred on a steam bath for about two hours and then allowed to cool. The precipitated solids were filtered off and washed with dimethylformamide. The combined filtrate and washings were evaporated in vacuo to yield, as an oil, 25.6 g. of 1-ethyl-3,4-dihydro-2(1H)-isoquinolinecarboxamidoxime.

(35) 3,4 - dihydro-1-methyl-2(1H)-isoquinolinecarboxamidoxime N,N,O-triacetate: To an ice-cooled solution containing 10.0 g. of 3,4 - dihydro-1-methyl-2(1H)-isoquinolinecarboxamidoxime in 100 ml. of pyridine was added fairly rapidly 20 ml. of acetic anhydride and the resulting mixture was kept at room temperature for about fifteen hours. The reacted mixture was concentrated to about one-half volume at 40–50° C. and 25 mm., and then poured into water. The aqueous mixture was extracted with ether. The ether extract was washed with water, dried over anhydrous magnesium sulfate and evaporated in vacuo to remove the ether. Toluene was added and evaporated in vacuo to yield a gummy material. The gum was taken up in 250 ml. of benzene and the benzene solution was washed with several portions of 2 N hydrochloric acid. The acid washings were combined and extracted with ether. The combined ether extract and benzene solution were dried over anhydrous magnesium sulfate and evaporated in vacuo to remove the solvents and to yield 7.0 g. of solid which was crystallized from 50 ml. of isopropyl acetate to yield 4.2 g. of the crystalline 3,4-dihydro-1-methyl - 2(1H)-isoquinolinecarboxamidoxime N,N,O-triacetate, M.P. 144–146.5° C., after drying in vacuo at 40° C. for two days.

The hypotensive activity of the 3,4-dihydro-2(1H)-isoquinolinecarboxamidoximes of the invention was determined by standard pharmacodynamic testing procedures, for example, in unanesthetized hypertensive dogs as described by Lape et al., Arch. Int. Pharmacodyn. Ther. 160, 342–351 (1966). When tested by said Lape et al. procedure by oral administration once daily in gelatin capsules for four consecutive days at each dosage level to unanesthetized hypertensive dogs, the compounds of the invention were found to have hypotensive activity, e.g., at doses of about 0.5 to 10 mg./kg./day.

The actual determination of the numerical biological data definitive for a particular compound is readily obtained according to the above standard test procedure, by technicians versed in pharmacological test procedures, without any need for any extensive experimentation.

The compounds of the invention can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Also, the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents, e.g., reserpine, diazoxide, pentolinium, hydralazine, phentolamine, methyldopa, hydrochlorothiazide, chlorothiazide, and the like.

I claim:
1. A compound of the formula

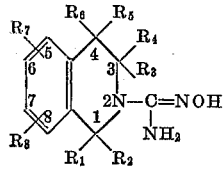

where $R_7$ and $R_8$ are each hydrogen, lower-alkyl, lower-alkoxy, halo, hydroxy or lower-alkanoylamino where lower-alkanoyl has from two to six carbon atoms inclusive; $R_1$ is hydrogen, lower-alkyl or trifluoromethyl; $R_2$ is hydrogen or lower-alkyl; $R_3$ and $R_4$ are each hydrogen or lower-alkyl; $R_5$ is hydrogen, lower-alkyl or hydroxy; $R_6$ is hydrogen or lower-alkyl; and provided at least one of the positions 1, 3 and 4 of the isoquinoline ring is substituted twice by lower-alkyl or position 1 is substituted by trifluoromethyl or position 4 is substituted by hydroxy when $R_7$ and $R_8$ are each hydrogen, lower-alkyl, lower-alkoxy or halo, where lower-alkyl, each occurrence, is primary or secondary and has from one to six carbon atoms inclusive.

2. A compound according to claim 1 where $R_1$ and $R_2$ are each methyl.

3. A compound according to claim 1 where $R_3$ and $R_4$ are each methyl.

4. A compound according to claim 1 where $R_5$ and $R_6$ are each methyl.

5. A compound according to claim 1 where $R_1$ is trifluoromethyl and $R_2$ is hydrogen.

6. 3,4-dihydro-1,1-dimethyl - 2(1H) - isoquinolinecarboxamidoxime according to claim 2.

7. 3,4 - dihydro - 1,3,3 - trimethyl-2(1H)-isoquinolinecarboxamidoxime according to claim 3.

8. 3,4 - dihydro - 4 - hydroxy-3,3-dimethyl-2(1H)-isoquinolinecarboxamidoxime according to claim 3.

9. 3,4 - dihydro - 1,4,4 - trimethyl-2(1H)-isoquinolinecarboxamidoxime according to claim 4.

10. 3,4 - dihydro - 4,4 - dimethyl-2((1H)-isoquinolinecarboxamidoxime according to claim 4.

11. 3,4 - dihydro - 1 - trifluoromethyl-2(1H)-isoquinolinecarboxamidoxime according to claim 5.

12. 3,4 - dihydro - 6 - hydroxyl - 1-methyl-2(1H)-isoquinolinecarboxamidoxime according to claim 1.

13. 5 - acetamido - 3,4 - dihydro-2(1H)-isoquinolinecarboxamidoxime according to claim 1.

14. 3,4 - dihydro - 5 - hydroxy-2(1H)-isoquinolinecarboxamidoxime according to claim 1.

15. 3,4 - dihydro - 1,3-dimethyl-2(1H)-isoquinolinecarboxamidoxime.

16. 3,4 - dihydro - 7 - methoxy - 1-methyl-2(1H)-isoquinolinecarboxamidoxime.

17. 3,4 - dihydro - 1,7 - dimethyl-2(1H)-isoquinolinecarboxamidoxime.

References Cited
UNITED STATES PATENTS

| | | |
|---|---|---|
| 2,947,782 | 8/1960 | De Benneville et al. _ 260—566 X |
| 2,951,843 | 9/1960 | Haack et al. _____ 260—288 |
| 2,970,145 | 1/1961 | De Benneville _____ 260—566 X |
| 3,169,289 | 2/1965 | Tieman et al. _____ 260—566 |
| 3,291,299 | 12/1966 | Wenner _____ 260—288 X |
| 3,314,963 | 4/1967 | Koch _____ 260—288 |
| 3,354,174 | 11/1967 | Bell _____ 260—562 X |
| 3,505,336 | 5/1970 | Bailey _____ 260—287 |

OTHER REFERENCES

Whaley et al.: in "Organic Reactions Vol. VI," p. 75, 103–9, 117, 121–3, 151–2, 174–5 (1951).

Genslen: in "Organic Reactions Vol. VI," p. 191–2, 202–4 (1951).

DONALD G. DAUS, Primary Examiner

U.S. Cl. X.R.

260—283 CV, 287 R, 999